(12) United States Patent
Nies

(10) Patent No.: US 8,174,144 B2
(45) Date of Patent: May 8, 2012

(54) BEARINGS HAVING RADIAL HALF CAGE

(75) Inventor: Jacob Johannes Nies, Zwolle (NL)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 12/974,207

(22) Filed: Dec. 21, 2010

(65) Prior Publication Data

US 2011/0221201 A1      Sep. 15, 2011

(51) Int. Cl.
*F03D 11/00* (2006.01)
*F16C 33/74* (2006.01)

(52) U.S. Cl. .......................................... 290/55; 384/486
(58) Field of Classification Search ............... 290/43, 290/44, 54, 55; 384/513, 486
See application file for complete search history.

(56) References Cited

U.S. PATENT DOCUMENTS

| | | | |
|---|---|---|---|
| 4,906,113 A | 3/1990 | Sague | |
| 5,165,804 A | 11/1992 | Fisher et al. | |
| 5,588,754 A | 12/1996 | Miller | |
| 5,957,000 A | 9/1999 | Pecorari | |
| 7,217,039 B2 | 5/2007 | Baudelocque et al. | |
| 7,360,310 B2 | 4/2008 | Bagepalli et al. | |
| 7,687,932 B2* | 3/2010 | Casazza et al. | 290/55 |
| 7,987,600 B2* | 8/2011 | Erill et al. | 29/898.07 |
| 7,988,364 B2* | 8/2011 | Versteegh et al. | 384/486 |
| 8,075,196 B2* | 12/2011 | Burner et al. | 384/558 |
| 8,109,729 B2* | 2/2012 | Andersen | 416/147 |
| 2010/0092120 A1* | 4/2010 | Nies et al. | 384/513 |
| 2011/0012360 A1* | 1/2011 | Numajiri | 290/55 |
| 2011/0236186 A1* | 9/2011 | Bech et al. | 415/170.1 |
| 2011/0309620 A1* | 12/2011 | Fujino et al. | 290/44 |

* cited by examiner

*Primary Examiner* — Nicholas Ponomarenko
(74) *Attorney, Agent, or Firm* — James W. Pemrick; Ernest G. Cusick; Frank A. Landgraff

(57) ABSTRACT

A bearing is provided having an inner ring with one or more inner raceways, and an outer ring positioned substantially radially outward from the inner ring. The outer ring has one or more outer raceways. A plurality of rolling elements is positioned between the inner raceways and the outer raceways. A cage for maintaining separation between neighboring rolling elements is oriented substantially radially and extending around at least a portion of each of the plurality of rolling elements.

9 Claims, 6 Drawing Sheets

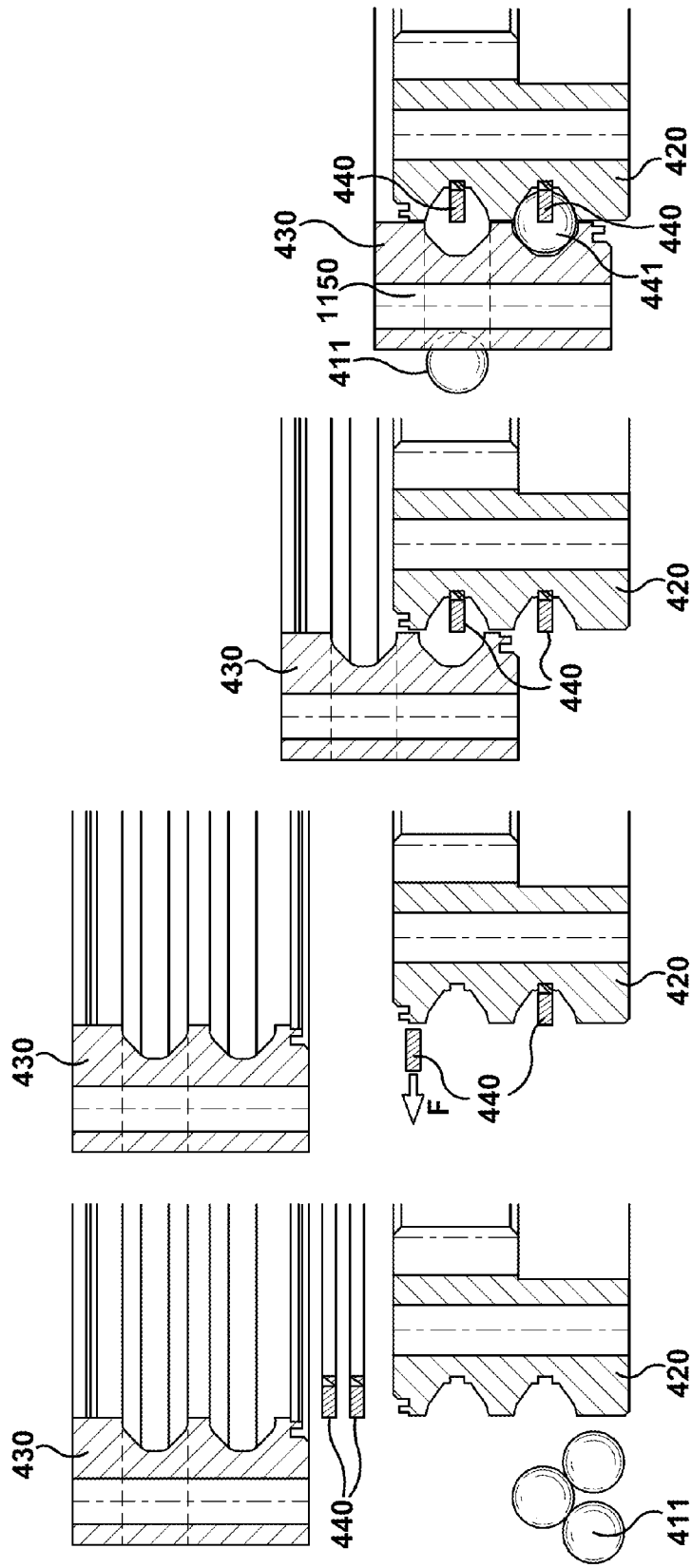

US 8,174,144 B2

BEARINGS HAVING RADIAL HALF CAGE

BACKGROUND OF THE INVENTION

This invention relates generally to bearings, and more particularly to bearings having a radial half cage.

Recently, wind turbines have received increased attention as environmentally safe and relatively inexpensive alternative energy sources. With this growing interest, considerable efforts have been made to develop wind turbines that are reliable and efficient.

Generally, a wind turbine includes a rotor having multiple blades. The rotor is mounted to a housing or nacelle, which is positioned on top of a truss or tubular tower. Utility grade wind turbines (i.e., wind turbines designed to provide electrical power to a utility grid) can have large rotors (e.g., 30 or more meters in diameter). Blades on these rotors transform wind energy into a rotational torque or force that drives one or more generators that may be rotationally coupled to the rotor through a gearbox. The gearbox steps up the inherently low rotational speed of the turbine rotor for the generator to efficiently convert mechanical energy to electrical energy, which is fed into a utility grid.

Wind turbines including direct drive generators eliminate the gearbox, and possible reliability problems associated with the gearboxes. However, in at least some known wind turbines, rotor bearings, pitch bearings, generator bearings and other bearings may prematurely fail. Because the bearings can be difficult to access and replace, failure of bearings can result in a lengthy and expensive repair process.

To facilitate reducing costs while optimizing turbine availability, bearing replacement and/or repair should be performed rapidly at the wind turbine site with a minimal infrastructure and skill set required. However, known bearings used in wind turbines generally require change-out at the factory or labor intensive and costly on-site repair.

BRIEF DESCRIPTION OF THE INVENTION

One aspect of the present invention provides a bearing comprising an inner ring having one or more inner raceways, and an outer ring positioned substantially radially outward from the inner ring. The outer ring has one or more outer raceways. A plurality of rolling elements is positioned between the one or more inner raceways and the one or more outer raceways. A cage for maintaining separation between neighboring rolling elements of the plurality of rolling elements, the cage oriented substantially radially and extending around at least a portion of each of the plurality of rolling elements.

Another aspect of the present invention provides a wind turbine having a tower, a nacelle mounted on top of the tower, and a rotor having one or more blades, where the rotor is attached to the nacelle. The wind turbine also includes a bearing having an inner ring with one or more inner raceways and an outer ring positioned substantially radially outward from the inner ring. The outer ring has one or more outer raceways. A plurality of rolling elements is positioned between the one or more inner raceways and the one or more outer raceways. A cage for maintaining separation between neighboring rolling elements of the plurality of rolling elements, the cage is oriented substantially radially and extends around at least a portion of each of the plurality of rolling elements.

BRIEF DESCRIPTION OF THE DRAWINGS

FIGS. 8-11 are partial cross-sectional illustrations of a bearing assembly method according to yet another aspect of the present invention.

DETAILED DESCRIPTION OF THE INVENTION

Figure 1:
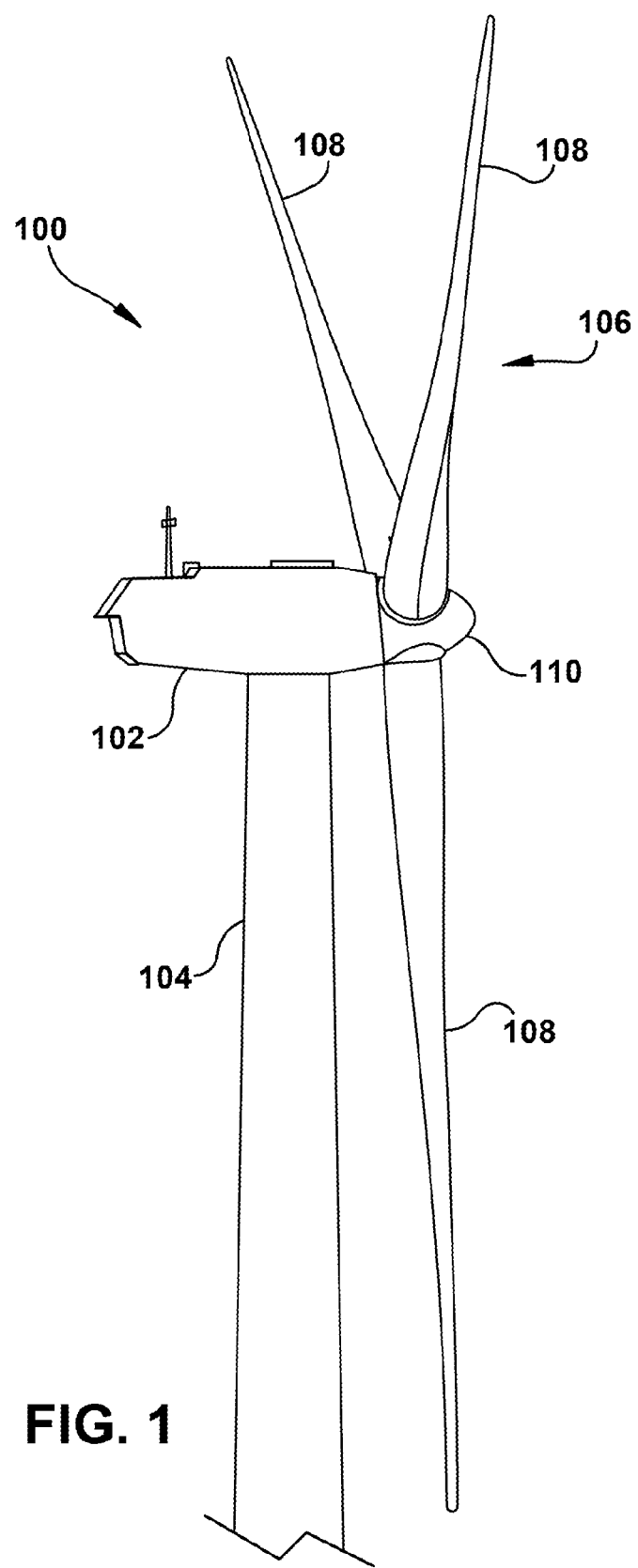
FIG. 1 is an illustration of an exemplary configuration of a wind turbine.

In some configurations and referring to FIG. 1, a wind turbine 100 comprises a nacelle 102 housing a generator (not shown in FIG. 1). Nacelle 102 is mounted atop a tall tower 104, only a portion of which is shown in FIG. 1. Wind turbine 100 also comprises a rotor 106 that includes one or more rotor blades 108 attached to a rotating hub 110. Although wind turbine 100 illustrated in FIG. 1 includes three rotor blades 108, there are no specific limits on the number of rotor blades 108 required by the present invention.

Figure 2:
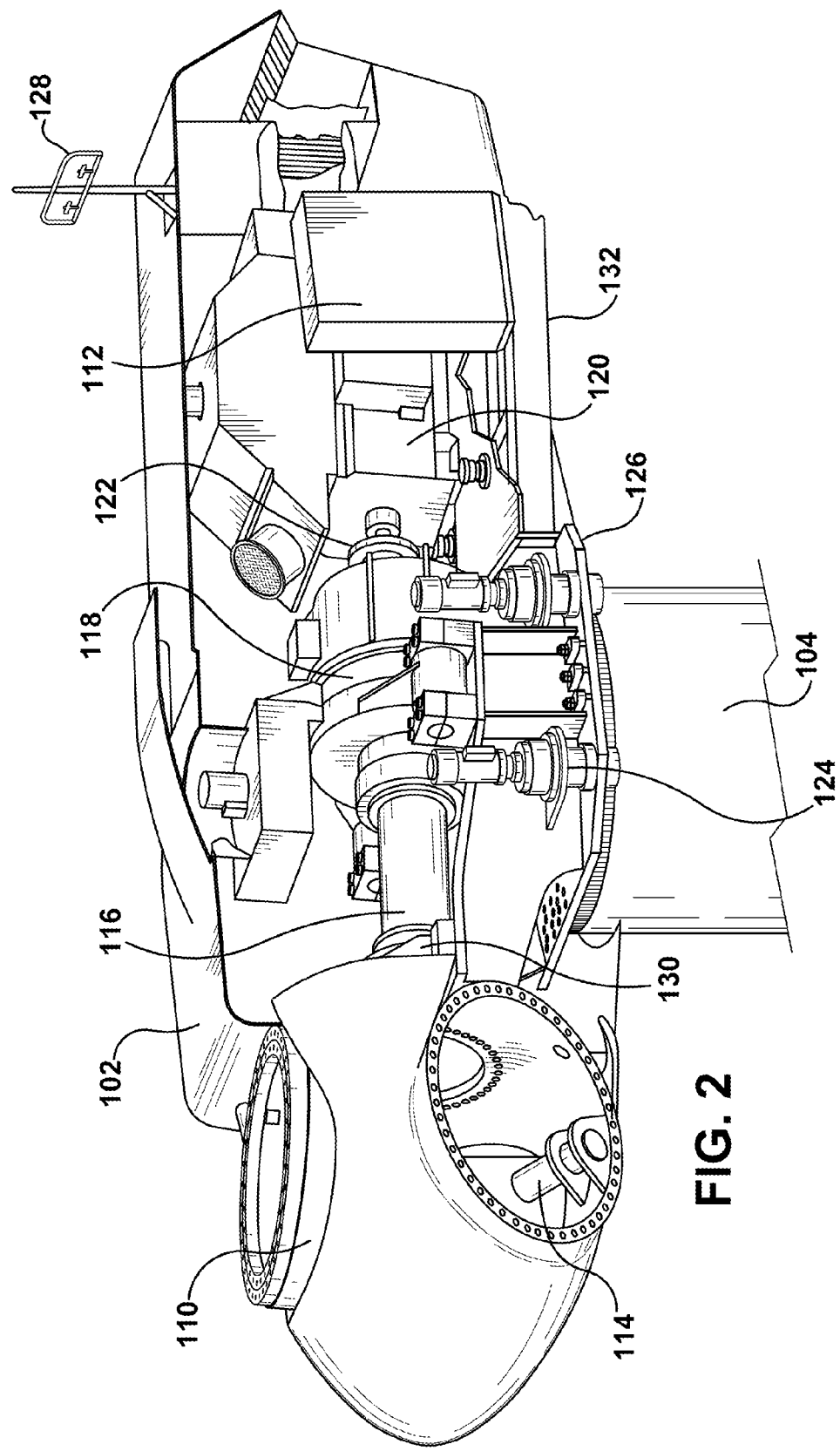
FIG. 2 is a cut-away perspective illustration of a nacelle of the exemplary wind turbine configuration shown in FIG. 1.

In some configurations and referring to FIG. 2, various components are housed in nacelle 102 atop tower 104 of wind turbine 100. The height of tower 104 is selected based upon factors and conditions known in the art. In some configurations, one or more microcontrollers within control panel 112 comprise a control system used for overall system monitoring and control. Alternative distributed or centralized control architectures are used in some configurations.

In some configurations, a variable blade pitch drive 114 is provided to control the pitch of blades 108 (not shown in FIG. 2) that drive hub 110 as a result of wind. In some configurations, the pitch angles of blades 108 are individually controlled by blade pitch drive 114. Hub 110 and blades 108 together comprise wind turbine rotor 106.

The drive train of the wind turbine includes a main rotor shaft 116 (also referred to as a "low speed shaft") connected to hub 110 via main bearing 130 and (in some configurations), at an opposite end of shaft 116 to a gear box 118. Gearbox 118 drives a high-speed shaft of generator 120. In other configurations, main rotor shaft 116 is coupled directly to generator 120. The high-speed shaft (not identified in FIG. 2) is used to drive generator 120, which is mounted on mainframe 132. In some configurations, rotor torque is transmitted via coupling 122. In some configurations of the present invention, generator 120 is a direct drive permanent magnet generator.

Yaw drive 124 and yaw deck 126 provide a yaw orientation system for wind turbine 100. A meteorological boom 128 provides information for a turbine control system, which may include wind direction and/or wind speed. In some configurations, the yaw system is mounted on a flange provided atop tower 104.

Figure 3:
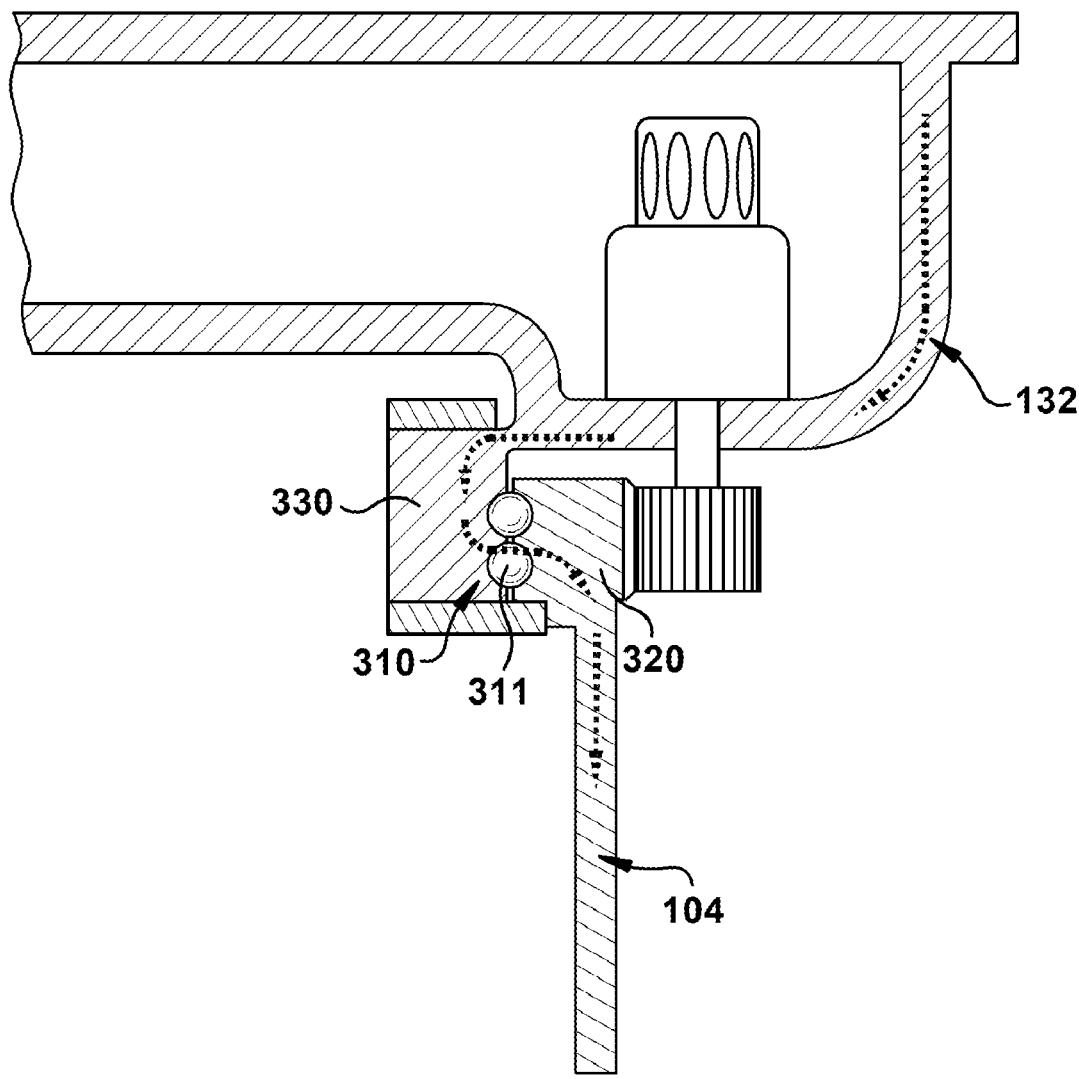
FIG. 3 is a sectional illustration of a yaw bearing shown connected between the tower and bedplate of a wind turbine.

FIG. 3 illustrates a bearing of the double row type. Bearings of this type can be used in the pitch or yaw system of wind turbines. This configuration may be chosen to compensate for high loads that occur infrequently. The bearing 310 is located at the junction between tower 104 and the nacelle's bedplate or mainframe 132. An outer ring 320 may be formed by or connected to a portion of the tower 104, and an inner ring 330 may be formed by or connected to a portion of the mainframe 132. The rolling elements 311 are placed between the inner and outer rings. The wind turbine 100 can be subject to occasional heavy gusts of wind. These gusts are typically of short duration, however they do exert extreme loads on the wind turbine. The wind can force the nacelle to tilt against one side of bearing 310. This force is transmitted from the main frame 132 through the yaw bearing 310 into tower 104. The double row bearing 310 has the advantage of being able to bear higher loads than single row bearings. In FIG. 3, the yaw bearing is shown having the gears on the outside, however, it is to be understood that the gears could be located externally or internally in both pitch and/or yaw systems.

Rolling elements in bearings, and especially in ball bearings, need to be kept apart in order to provide a low and even friction torque when turning. Spacers and cages are two examples of solutions. Spacers have the advantage in that they do not impact the raceways and thus such bearings have the highest load carrying capacity with respect to bending moments. However, spacers also have limited capacity to prevent congestion of rolling elements. A cage may be put between the two rings in order to be able to mount it. However, the cage does take away the area of the raceway that is most effective in load carrying in case of a bending moment.

Figure 4:
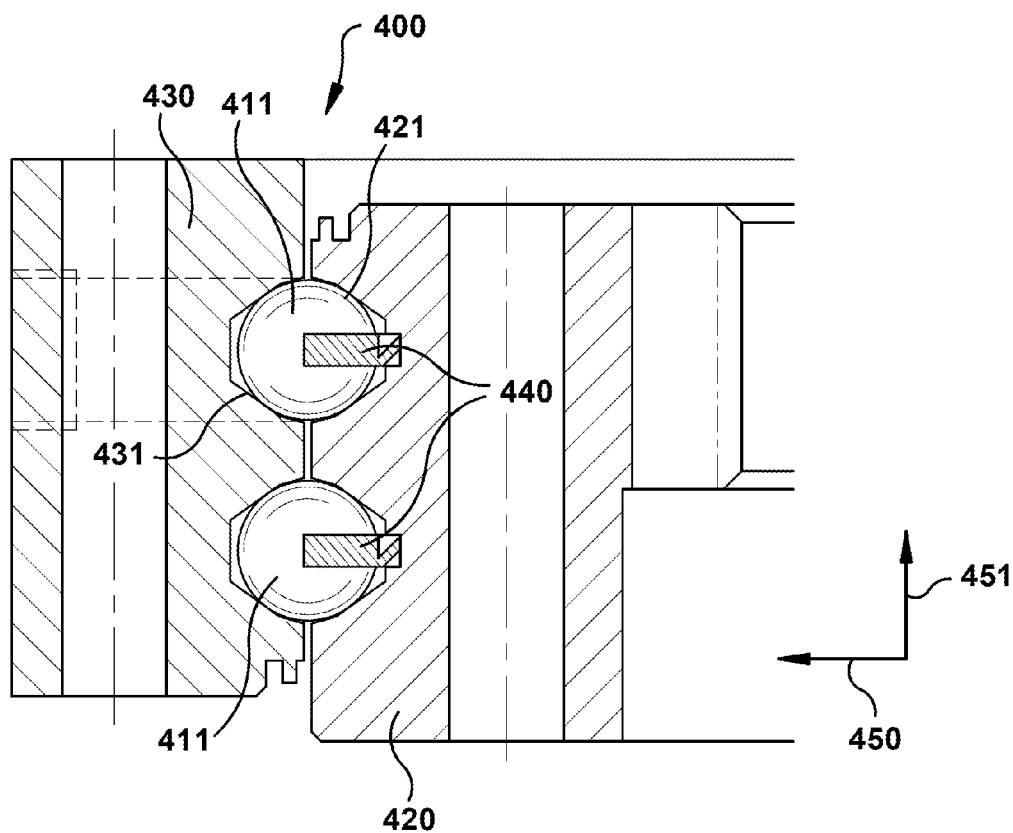
FIG. 4 is a cross-sectional illustration of a portion of a bearing, according to an aspect of the present invention.

FIG. 4 illustrates a partial, cross-section view of a bearing, according to an aspect of the present invention. The bearing 400 includes one or more sets of rolling elements 411 located between an inner ring 420 and an outer ring 430. The inner ring 420 may comprise a portion of the tower 104 and the outer ring 430 may comprise part of the nacelle 102 or bedplate 132, or the inner ring 420 may comprise a portion of the nacelle 102 or bedplate 132 and the outer ring 430 may comprise part of the tower 104. The inner ring 420 includes one or more inner raceways 421, and the outer ring 430 includes one or more outer raceways 431 that are aligned with the inner raceways 421.

The bearing 400 may have one or more sets of rolling elements (two are shown), and the rolling elements can be a ball bearing, a sphere, a roller bearing, a tapered roller bearing, a barrel shaped roller bearing and a cylindrical element ball bearing, or any other suitable bearing device. FIG. 4 illustrates a bearing having two axially spaced sets of rolling elements, where each of the two axially spaced sets are oriented radially and circumferentially around the inner and/or outer rings. The rolling elements 411 are each paired with a cage 440 that partially surrounds the rolling element 411 in a radial plane. The axial direction is indicated by arrow 451 and extends generally axially up and down the center of the tower 104, while the radial plane is indicated by arrow 450 and extends in an orthogonal direction 360° around the axial direction. By putting the cage 440 in the radial plane, the least load contributing area of the raceways 421 and 431 is utilized to make room for a cage. The cage 440 does not entirely encapsulate the ball 411 in 360° as this would prevent the inner ring 420 and outer ring 430 from being positioned around each other. However, a cage 440 that extends generally 180° or less around the rolling elements 411 solution would permit the rings 420 and 430 to be positioned around each other. In some applications it may be desirable to have the cage 440 extend slightly greater than 180° around the rolling elements 411. In some applications the cage may be able to be designed to fully encircle the rolling element, while still enabling the inner and outer rings to be positioned around each other.

Figure 5:
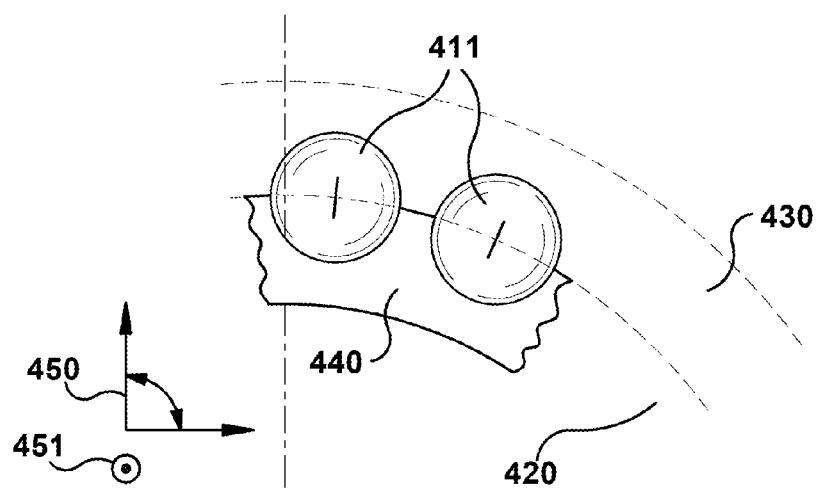
FIG. 5 is an illustration of a partial top view of a bearing according to one aspect of the present invention.

FIG. 5 illustrates a partial, top view of the bearing 400. The rolling elements 411 are located between the inner ring 420 and outer ring 430. The rolling elements 411 (only two of which are shown) located circumferentially around the tower in one or more radial planes. A radial plane is indicated by arrows 450, and it extends along the page of the drawing. The axial direction is indicated by 451 and extends into or out of the page. The cage 440 may be comprised of multiple elements joined together to form a circumferential or ring-like element. The cage 440 extends around about half of each rolling element 411, but may be designed to extend around less than or more than half of each rolling element as well. Two neighboring rolling elements have two circumferential contact points located therebetween, and the cage can be located between these two circumferential contact points.

A cage may be thicker in such design as it does not take valuable support surface from the cage away from the inner or outer rings. Radial cages may have difficulty with assembly if they are in one piece. A one piece cage will not be slid into its slot by itself, rather it has to fit like a tire on a rim. A rim normally has a groove between the seats of the heel of the tire so the lack of length in circumferential direction can be accommodated by partially putting the tire in the deepest area of the groove.

Figure 6:
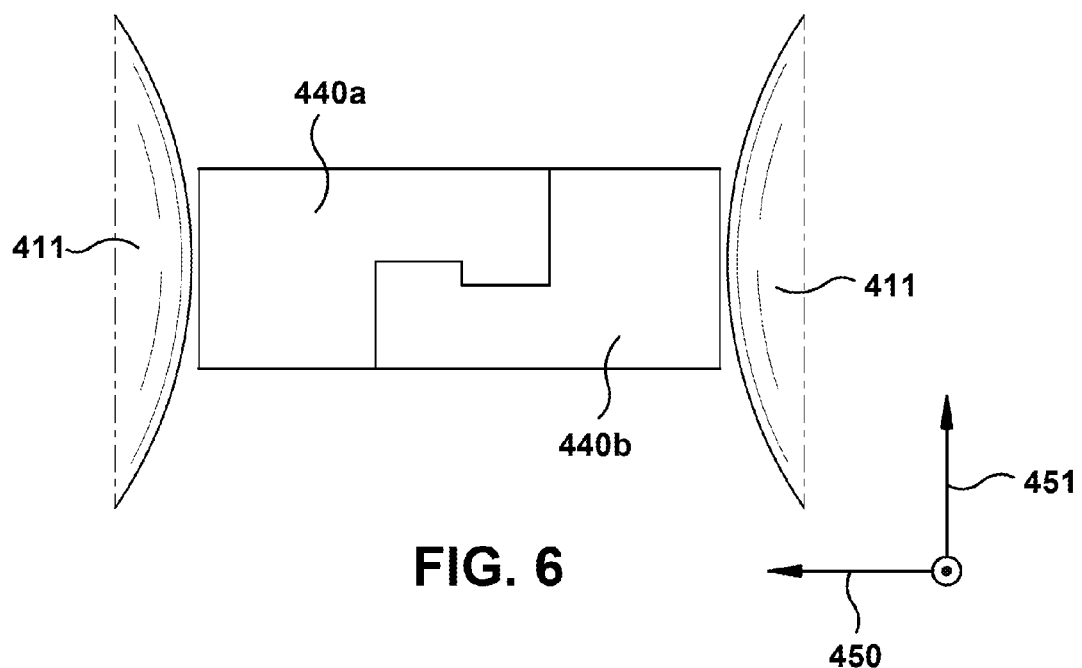
FIG. 6 is an illustration of radial view of a bearing according to an aspect of the present invention.

FIG. 6 illustrates a partial, side view of a portion of bearing 400 looking radially inward or outward. In some applications a bearing ring may not have the possibility to accommodate a deeper groove, as that could undermine the load path of the bolts through the bearing. One solution could be to have a slotted connection between two ends of adjacent cages. Each cage 440 may be joined to neighboring cages by any suitable joint as desired in the specific application. For example, cage 440a is joined to cage 440b by a type of locking rabbet joint. Other types of joints may be used as well, including the use of mechanical fasteners or adhesives to join the adjacent cages.

Figure 7:
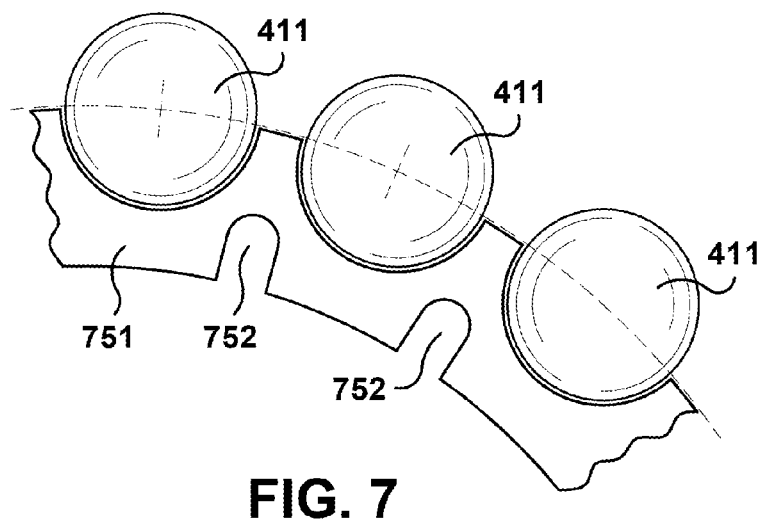
FIG. 7 is an illustration of a partial top view of a bearing according to one aspect of the present invention.

FIG. 7 illustrates a top view of a cage 751, according to an aspect of the present invention. Another solution could be to provide a more flexible cage that can placed around the inner or outer ring in one or more pieces. Cage 751 includes a plurality of notches 752, which may be provided on the inner or outer radius of the cage 751. The notches 752 allow the cage to flex and enable the cage to be placed around the inner or within the outer ring.

The cages described herein may have a low width to radius ratio. This enables the cages to be manufactured by punching the cages from appropriate stock in a straight strip, and then bending the cage into curved segments, or even a complete circle. The end(s) of the cages can then be welded, brazed or joined in any suitable manner as desired in the specific application.

FIGS. 8-11 illustrate an assembly process, according to an aspect of the present invention. FIG. 8 illustrates an exploded view of some of the main elements, and is mainly provided to show the separate elements before assembly. The inner ring 420 is paired with one or more cages 440. The outer ring 430 is positioned to be placed over the inner ring 420. The rolling elements 411 are not yet installed.

FIG. 9 shows one cage 440 (the lower one) installed in the lower raceway of the inner ring 420. The second cage 440 (the upper one) is in the process of being installed in the upper raceway of the inner ring 420. The cages 440 may be constructed of one piece or multi-piece elements.

FIG. 10 illustrates a point in the assembly process where both cages 440 are installed on the inner ring 420, and the outer ring 430 is in the process of being lowered into position around the inner ring 420. The rolling elements 411 are not yet installed.

FIG. 11 illustrates a step in the assembly process where the outer ring 430 is positioned over the inner ring 420. The rolling elements 411 are now being installed in the respective raceways of the two rings. Slots or channels 1150 are provided in the outer ring (as shown) and/or the inner ring 420

(not shown). These channels 1150 can be used to insert the rolling elements 411 into position in the raceways and the appropriate portion of cages 440. The channels 411 can then be blocked off with a plug, wedge or bolt, or any other suitable device as desired in the specific application.

It is to be understood that all aspects of this invention can be applied to either or both of the pitch or yaw bearings in the wind turbine. In addition, the present invention could also be applied to any other wind turbine system or element that needs a bearing system.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A wind turbine comprising:
   a tower;
   a nacelle mounted on top of the tower;
   a rotor having one or more blades, the rotor attached to the nacelle;
   a bearing comprising;
      an inner ring having one or more inner raceways;
      an outer ring positioned substantially radially outward from the inner ring, the outer ring having one or more outer raceways;
      a plurality of rolling elements positioned between the one or more inner raceways and the one or more outer raceways;
      a cage for maintaining separation between neighboring rolling elements of the plurality of rolling elements, the cage oriented substantially radially and extending around at least a portion of each of the plurality of rolling elements.

2. The wind turbine of claim 1, wherein the cage is comprised of segmented cage elements, wherein the segmented cage elements are joined together to form the cage.

3. The wind turbine of claim 2, wherein the segmented cage elements are joined together by a locking rabbet joint.

4. The wind turbine of claim 1, wherein the cage includes a plurality of notches for adding flexibility to the cage.

5. The wind turbine of claim 1, wherein the cage extends around about half of each rolling element.

6. The wind turbine of claim 1, wherein the cage is placed around or within at least one of the inner ring and the outer ring.

7. The wind turbine of claim 1, wherein the plurality of rolling elements are chosen from at least one of the following group:
   a ball, a sphere, a roller, a tapered roller, a barrel shaped roller and a cylindrical element.

8. The wind turbine of claim 1, wherein there are two rows of rolling elements, each of the two rows being oriented radially and circumferentially around at least one of the inner ring and the outer ring.

9. The wind turbine of claim 1, wherein the bearing comprises at least one of a pitch bearing and a yaw bearing.

\* \* \* \* \*